(12) United States Patent
Hildner et al.

(10) Patent No.: US 10,317,090 B2
(45) Date of Patent: Jun. 11, 2019

(54) OVEN DOOR AND OVEN COMPRISING AN OVEN DOOR

(71) Applicant: Electrolux Appliances Aktiebolag, Stockholm (SE)

(72) Inventors: Dietmar Hildner, Rothenburg ob der Tauber (DE); Branko Ivanovic, Rothenburg ob der Tauber (DE); Erhard Käser, Rothenburg ob der Tauber (DE); Antonio Aguilar, Stockholm (SE); Morgan Börjesson, Stockholm (SE); Mathieu Riviere, Stockholm (SE)

(73) Assignee: Electrolux Appliances Aktiebolag, Stockholm (SE)

( * ) Notice: Subject to any disclaimer, the term of this patent is extended or adjusted under 35 U.S.C. 154(b) by 172 days.

(21) Appl. No.: 15/321,581

(22) PCT Filed: Jun. 24, 2015

(86) PCT No.: PCT/EP2015/064182
§ 371 (c)(1),
(2) Date: Dec. 22, 2016

(87) PCT Pub. No.: WO2016/012177
PCT Pub. Date: Jan. 28, 2016

(65) Prior Publication Data
US 2017/0205078 A1    Jul. 20, 2017

(30) Foreign Application Priority Data

Jul. 25, 2014  (EP) .................................. 14178551
Aug. 4, 2014  (EP) .................................. 14179643

(51) Int. Cl.
*F21V 8/00*   (2006.01)
*F24C 7/08*   (2006.01)
(Continued)

(52) U.S. Cl.
CPC ............ *F24C 7/082* (2013.01); *F21V 23/008* (2013.01); *F21V 33/0044* (2013.01);
(Continued)

(58) Field of Classification Search
CPC ........ F24C 7/082; F24C 15/006; F24C 15/04; F21V 23/008; F21V 33/0044;
(Continued)

(56) References Cited

U.S. PATENT DOCUMENTS

| 8,021,009 B2 | 9/2011 | Knoll et al. |
| 2006/0049188 A1 | 3/2006 | Gramlich et al. |
| 2010/0139638 A1* | 6/2010 | Hargrave ............... F24C 15/008 126/19 R |
| 2011/0049121 A1* | 3/2011 | Reinhard-Herrscher ................... F24C 7/082 219/220 |

FOREIGN PATENT DOCUMENTS

| DE | 20103517 U1 | 5/2001 |
| DE | 10347763 A1 | 5/2005 |

(Continued)

OTHER PUBLICATIONS

EP Communication dated Mar. 9, 2017 for EP 14179643.3, 22 pages.
(Continued)

*Primary Examiner* — Bao Q Truong
(74) *Attorney, Agent, or Firm* — Pearne & Gordon LLP

(57) ABSTRACT

The invention relates to an oven door (10) for closing a cavity (2) of an oven (1) comprising a glass portion (11) being at least partially transparent for enabling a user to look into the oven cavity (2), wherein the oven door (10) comprises lighting means (12) implementing an optical user interface for displaying optical information at the glass portion (11).

17 Claims, 3 Drawing Sheets

(51) Int. Cl.
  *F24C 15/04* (2006.01)
  *F21V 23/00* (2015.01)
  *F21V 33/00* (2006.01)
  *F24C 15/00* (2006.01)
  *F21Y 113/17* (2016.01)
  *F21Y 115/10* (2016.01)

(52) U.S. Cl.
  CPC ............ *F24C 15/006* (2013.01); *F24C 15/04* (2013.01); *G02B 6/001* (2013.01); *G02B 6/006* (2013.01); *G02B 6/0043* (2013.01); *G02B 6/0085* (2013.01); *G02B 6/0095* (2013.01); *F21Y 2113/17* (2016.08); *F21Y 2115/10* (2016.08)

(58) Field of Classification Search
  CPC ...... F21V 29/50; F21V 29/502; F21V 29/503; F21V 29/60; F21V 29/002; F21V 29/004; F21V 29/02; G02B 6/001; G02B 6/0043; G02B 6/006; G02B 6/0085; G02B 6/0095; F21Y 2113/17; F21Y 2115/10
  See application file for complete search history.

(56) References Cited

FOREIGN PATENT DOCUMENTS

| | | | |
|---|---|---|---|
| DE | 102009011803 | A1 | 9/2010 |
| DE | 102011080073 | A1 | 1/2013 |
| DE | 102012103684 | A1 | 10/2013 |
| DE | 102012218005 | A1 | 4/2014 |
| EP | 1376872 | A2 | 1/2004 |
| FR | 2745067 | A1 | 8/1997 |
| FR | 2944093 | A1 | 10/2010 |

OTHER PUBLICATIONS

International Search Report & Written Opinion issued in corresponding PCT Application No. PCT/EP2015/064182 dated Aug. 17, 2015, 9 pages.

\* cited by examiner

OVEN DOOR AND OVEN COMPRISING AN OVEN DOOR

Generally, the present invention relates to the field of food preparation appliances. More specifically, the present invention relates to an oven door comprising a user interface for displaying information.

BACKGROUND OF THE INVENTION

Ovens for food preparation are well-known in prior art. Said ovens comprise a base body forming an oven cavity with a cavity opening for receiving the food to be prepared. In addition, the oven comprises a door for closing the cavity opening. The oven door acts as thermal barrier to keep the heat energy in the cavity during operation of the oven. Typically, oven doors are at least partially transparent in order to enable the user to control the process of food preparation within the closed cavity. State of the art ovens comprise a user interface located above the oven door and attached to the oven base body for providing information to the user, e.g. baking temperature, baking period etc.

German patent application DE 10 2007 015 237 A1 discloses a baking oven comprising an oven cavity and an oven door for closing the oven cavity. The oven door comprises a lighting unit for illuminating the oven cavity.

SUMMARY OF THE INVENTION

It is an objective of the embodiments of the invention to provide an oven door and an oven with an improved user interface.

If not explicitly indicated otherwise, embodiments of the invention can be freely combined with each other.

According to an aspect of the invention, the invention relates to an oven door for closing a cavity of an oven. The oven door comprises a glass portion being at least partially transparent for enabling a user to look into the oven cavity. The oven door comprises lighting means implementing an optical user interface for displaying optical information at the glass portion. Specifically, the lighting means may provide information regarding the operating state of the oven, the temperature etc. The information may be provided without any characters, e.g. only based on the number of light elements used for providing said information, the light intensity and/or the color of light. Of course, also other kinds of providing information may be possible, e.g. by blinking lighting means. Said lighting means may be arranged at or within the oven door and may be coupled with a control unit for providing said visual information to the user. Said oven door is advantageous because the glass portion of the oven door provides a large area at which the information can be provided. Therefore, the information can also be recognized even from a large distance (e.g. several meters).

According to embodiments, the lighting means comprise one or more light sources arranged at the glass portion. Said light sources may be bulbs or light emitting diodes which are attached to the glass portion such that the light emitted by the light source can be recognized by the user in front of the glass portion. Preferably, the lighting sources are arranged behind a glass element providing said glass portion and are arranged such that the light emitted by the light sources propagates through the glass element.

According to embodiments, the lighting means comprise one or more light guides arranged at or in proximity to the glass portion. Said light guides may be used to guide the light in a predefined way in order to provide light at a certain area of the glass portion, e.g. light stripes According to embodiments, the light guides are optical fibres, e.g. optical glass fibres. Said optical glass fibres are resistant to heat, temperature variations and humidity.

According to embodiments, the optical fibres are glued to the inner surface of the glass portion or are fixed by a protective layer attached at the inner surface of the glass portion. Specifically, the glass portion may be constituted by a glass element and the optical fibres are arranged at the inner surface of said glass element facing the oven cavity of the oven. Upper-mentioned attaching of the optical fibres is advantageous because a permanent and robust fixing of the fibres is achieved.

According to embodiments, the optical fibres are side emitting fibres adapted to emit light in the front direction of the oven door. Said side emitting fibres are semi-transparent, i.e. provide spatially distributed reflection behaviour. Thereby, the fibre is illuminated over its entire length, leading to stripe-like lighting means. The outer diameter of the optical fibres may be, for example, 0.5 mm to 5 mm.

According to further embodiments, the light guides are milled or grinded into the glass portion. Thereby, grooves within the glass element are obtained. By means of said grooves, light is guided along the surface of the glass element in order to obtain stripe-like lighting means. Thereby, the light guides are integrated within the glass element.

Irrespective of the kind of implementation of the light guides, said light guides may preferably extend to a least one edge of the glass element. The light source may be also arranged at said edge. Thereby, light emitting from the light source may be directly coupled into the one or more light guides in order to improve the coupling efficiency.

According to further embodiments, the light guides are coupled with light sources arranged at the outer edge of the glass portion or within a frame of the oven door. Thereby, the light sources can be placed in an area of the oven door which is not visible through the glass portion. In addition, the light sources can be placed in a region of reduced heat impact.

According to further embodiments, the light sources are cooled by an air stream flowing through the oven door. Said air stream may be provided through openings within the frame of the oven door, for example by means of a fan.

According to further embodiments, the oven door comprises an outer glass element and an inner glass element, wherein the lighting means are arranged between the inner and outer glass element. Preferably, the lighting means, i.e. the light sources and the light guides are arranged at or in direct proximity to the inner surface of the outer glass element in order to reduce the heat impact on the lighting means. In addition, said arrangement of the light guides is advantageous because perception of the light emitted by the light guides is improved. A gap may be provided between the inner and outer glass element. The gap may be filled with air thereby further reducing the heat impact on the lighting means. Preferably, cool air is conveyed through the gap in order to provide a cooling of the lighting means.

According to further embodiments, the lighting means comprise at least one light emitting diode. Thereby, high energy efficiency and an optimized integration of the lighting means into the oven door are achieved.

Preferably, the light emitting diode is a multi-colour light emitting diode. Thereby, by means of one light emitting diode, a plurality of information can be provided to the user based on the chosen light colour. For example, the light emitting diode may be a digital programmable multi-colour light emitting diode.

A digital programmable light emitting diode is a LED which offers colour and/or brightness controls etc. For example, the digital programmable multi-colour light emitting diode may be controlled by a control unit of the oven according to the oven function.

According to further embodiments, a control unit for driving the lighting means is arranged in a frame of the oven door. The control unit may be placed in close proximity to the front side, i.e. the outer side of the oven door in order to reduce the ambient temperature of the control unit. Additionally, the control unit may be cooled by cool air. Alternatively, the control unit for driving the lighting means is arranged in the base body of the oven.

According to further embodiments, the light sources are connected to a power supply powering the light sources by means of a cable connection.

According to other embodiments, the light sources are powered by means of wireless power charging coil. For example, a power charging receiver coil is attached to the oven door and connected to the light sources whereas a power charging transmitting coil is arranged at oven base body or oven cavity, preferable at the bottom side of the oven base body or oven cavity. The power charging transmitting coil may be connected with a power supply of the oven and inductively coupled with the power charging receiver coil. There may be wireless power transmission between the power charging transmitting coil and power charging receiving coil in order to power the light sources.

According to a further aspect, the invention refers to an oven for preparing food. Said oven comprises an oven cavity and an oven door for closing the oven cavity. The oven door is configured according to the embodiments described above.

The terms "essentially", "substantially" or "approximately" as used in the invention means deviations from the exact value by +/−10%, preferably by +/−5% and/or deviations in the form of changes that are insignificant for the function.

BRIEF DESCRIPTION OF THE DRAWINGS

The various aspects of the invention, including its particular features and advantages, will be readily understood from the following detailed description and the accompanying drawings, in which.

DETAILED DESCRIPTION OF PREFERRED EMBODIMENTS

Figure 1:
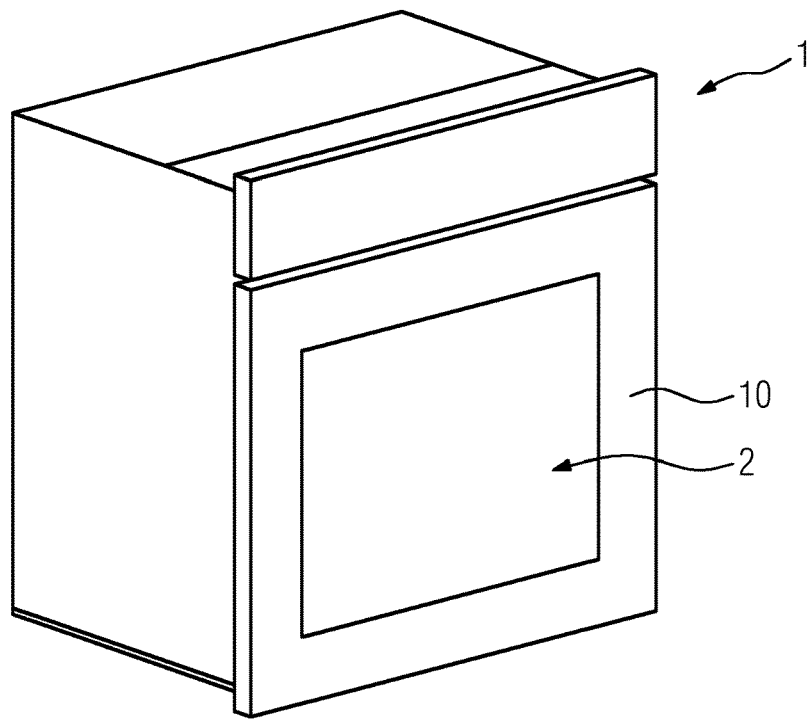
FIG. 1 shows an example schematic view of a baking oven.

The present invention will now be described more fully with reference to the accompanying drawings, in which example embodiments are shown. However, this invention should not be construed as limited to the embodiments set forth herein. Throughout the following description similar reference numerals have been used to denote similar elements, parts, items or features, when applicable.

FIG. 1 shows a schematic diagram of a baking oven 1. The baking oven 1 comprises an oven cavity 2 which is adapted to receive the food to be cooked and/or baked. The baking oven 1 further comprises an oven door 10 which can opened in order to place the food into the oven cavity 2 and closed in order to obtain a closed oven cavity 2.

Figure 2:
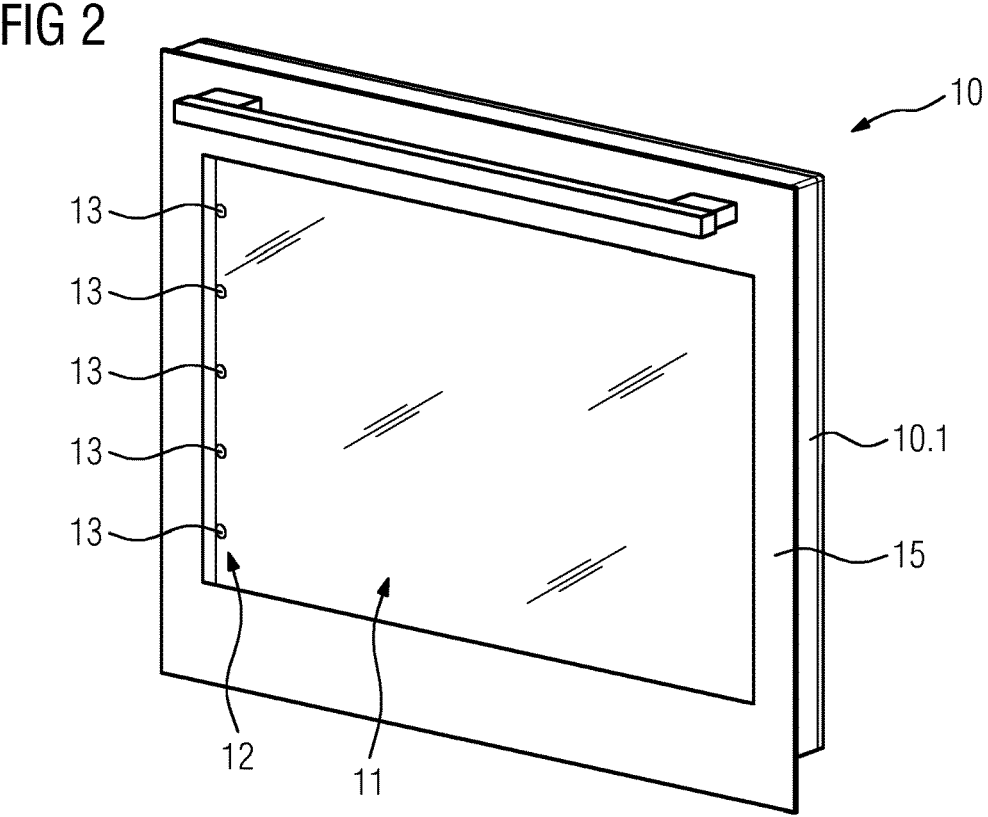
FIG. 2 shows an example schematic view of an oven door according to a first embodiment.
Figure 3:
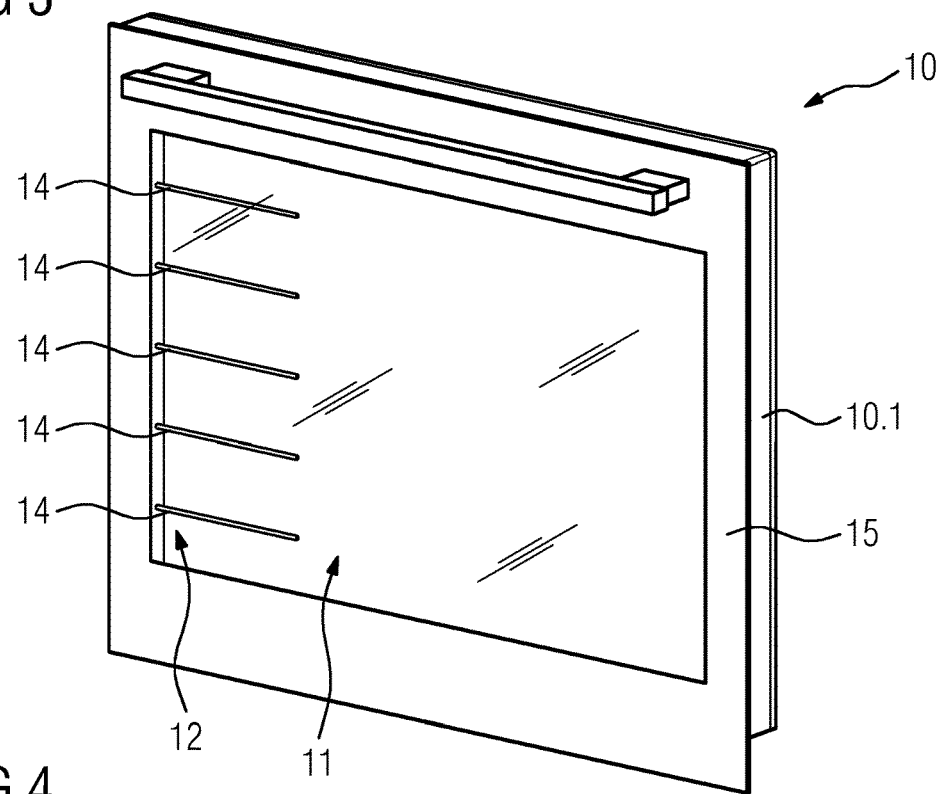
FIG. 3 shows an example schematic view of an oven door according to a second embodiment.
Figure 4:
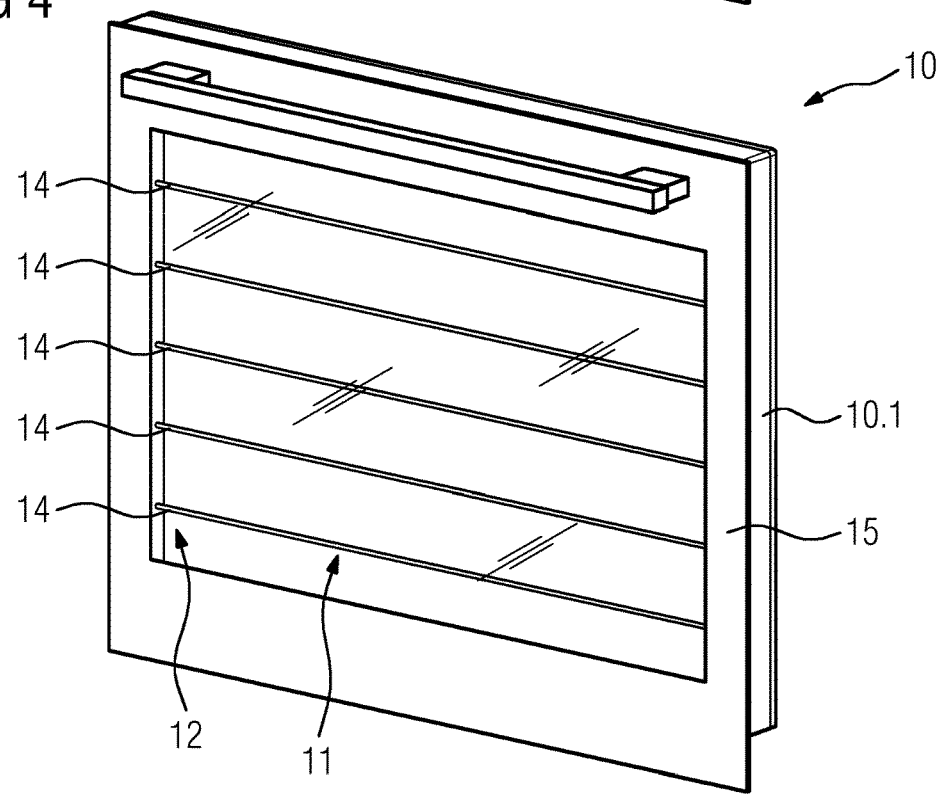
FIG. 4 shows an example schematic view of an oven door according to a third embodiment.

FIGS. 2 to 4 show the oven door 10 in closer detail. The oven door 10 comprises a frame 10.1 which may border the oven door circumferentially. The frame 10.1 may build the supporting structural element of the oven door 10, by means of which the oven door is attached to the base body of the oven 1. The oven door 10 further comprises a glass portion 11 which is constituted by a transparent glass in order to enable a user to look into the oven cavity 2 during the food preparation process without opening the oven door 10.

In the area of the glass portion 11, the oven door 10 comprises lighting means 12. Said lighting means 12 implement a user interface, i.e. the lighting means are adapted for displaying optical information at the glass portion 11 which can be recognized by the user. Said information may be, for example, but without limiting character, a heat up indicator, an indicator for the baking level to be used, a warning indicator, a door lock indicator, a door temperature indicator etc.

The lighting means 12 may be formed by one or more light sources 13 placed at or in vicinity to the glass portion 11. More in detail, the light sources 13 may be placed at or in vicinity to an inner surface of the glass portion 11, i.e. the light emitted by the lighting means 12, respectively, the light sources 13 is emitted through the glass portion 11 in order to be noticed by the user of the oven 1. Typically, the oven door 10 comprises multiple glass elements, which are arranged in a sandwich-like structure. Said glass elements are arranged at a distance to each other thereby confining a space between them. The lighting means 12, respectively, the light sources 13 may be placed between the glass elements in order to protect said lighting means 12 or light sources 13 against dirt, humidity etc. In addition, the temperature between the glass elements may be reduced, so the lighting means 12 or light sources 13 may be at least partially protected against heat impacts.

The light sources 13 may be constituted by light emitting diodes which are preferably arranged along the edges of the glass portion 11, i.e. in vicinity to the transition area between the frame 10.1 and the glass portion 11. For example, the light sources may be arranged at the left and/or right edge and/or at the upper and/or lower edge of the glass portion 11. The light emitting direction of the light emitting diodes may be perpendicular to the surface of the glass portion 11 wherein the light is emitted towards the space being opposite to the oven cavity 2. According to the embodiment of FIG. 2, a set of light sources 13 are arranged at a distance to each other in a column-like manner.

FIGS. 3 and 4 illustrate further examples of an oven door 10 according to embodiments of the invention. In general, the oven door 10 is configured similarly to the embodiment according to FIG. 2. The main difference is that the oven door 10 comprises one or more light guides 14 which are arranged at or in proximity to the glass portion 11. According to the present embodiments, the light guides 14 are straight and arranged horizontally. Specifically, the oven door may comprise a plurality of light guides 14 being spaced to each other. Said light guides 14 may be arranged horizontally. Alternatively, the light guides 14 may be arranged vertically. The light guides 14 may extend over the entire width or height of the glass portion 11. Alternatively, the light guides 14 may only extend over a partial width or partial height of the glass portion 11, i.e. may extend from a boundary area into an inner area of the glass portion 11.

The light guides 14 may be constituted by optical fibres. Said fibres may be glued or adhered to the glass element building the glass portion. Alternatively, the optical fibres may be fixed to said glass element by means of a protective, transparent layer. Said protective layer may span the optical fibre at its rear surface, i.e. the surface being opposite to the glass element. Preferably, said fibres are semi-transparent fibres, wherein the light propagating through the fibre is reflected in a spatially distributed manner in order to be emitted in a radial direction. Thereby, the light is emitting over the whole length of the light guides 14 and the user may recognize a strip-like lighting mean 12. In other words, the optical fibres are side emitting glass fibres. The optical fibres may comprise an outer diameter in the range of 0.5 mm-5 mm.

Each light guide 14 may be connected at least at one free end with a light source 13 for coupling light into the light guide 14. The light source 13 may be a light emitting diode, specifically a RGB-LED adapted to emit multi-colour light. The light source 13 may be arranged behind a cover plate 15 surrounding the glass portion 11. In case that the light guide 14 spans the whole width or height of the glass portion 11, the light guide 14 may be coupled at both ends with a light emitting diode in order to couple light from both sides into the fibre.

Figure 5:
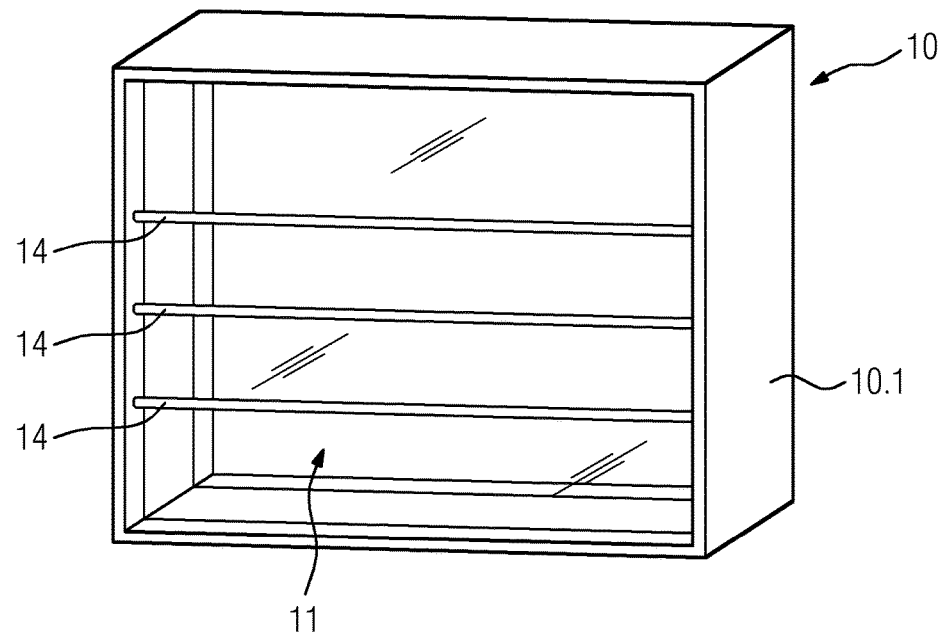
FIG. 5 shows an example schematic view of an oven door according to a fourth embodiment.

FIG. 5 shows a further embodiment of an oven door 10 comprising a glass portion 11 and a frame 10.1. According to the present embodiment, the light guides 14 are provided by grooves or stripes grinded or milled in the glass element forming the glass portion 11. The grooves or stripes may be provided at the inner surface of the glass portion 11, i.e. the surface which is facing the oven cavity 2. By providing said grinded or milled grooves or stripes light paths are obtained configured for guiding light along said groove or stripe. At one or both free ends of the grooves or stripes, light sources, specifically LEDs may be provided adapted for coupling light into the grooves or stripes. The surface within said grooves or stripes may be roughened in order to reflect the light propagating within said groove or stripe in order to effect spatially distributed reflections at said rough surface. Said reflected light may lead to a visible light stripe along the glass portion 11 of the oven door 10.

Figure 6:
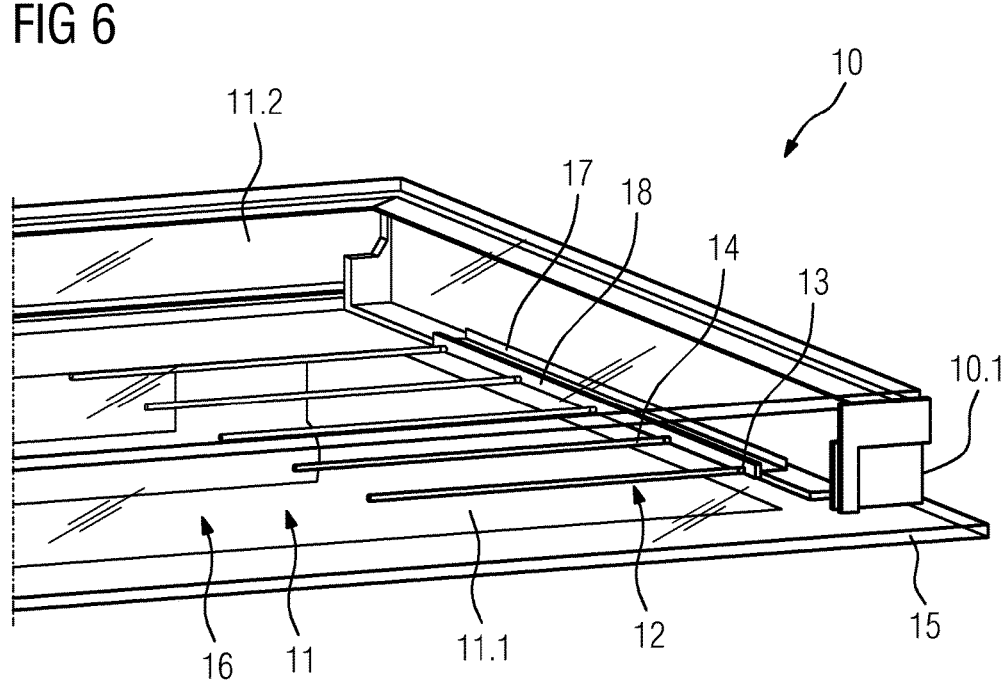
FIG. 6 shows a sectional perspective view of the oven door according to FIG. 3.

FIG. 6 shows a sectional view of the oven door 10 according to FIG. 3. The oven door 10 shows a sandwich-like structure comprising an inner glass element 11.1 which is directly facing the oven cavity 2 and an outer glass element 11.2 being arranged at a distance to the inner glass element 11.1 and forming at least partially the outer surface of the oven door 10. In order to obtain a structural strength of the oven door 10, the oven door may comprise a frame 10.1 or any other structural element, e.g. a bar-like structural element. The outer and inner glass element 11.1, 11.2 may be attached to the structural element. Between the outer and inner glass element 11.1, 11.2, a gap 16 is provided which may comprise air. Thereby, an air layer is provided between the outer and inner glass element 11.1, 11.2 avoiding an excessively heating up of the outer glass element 11.1.

The lighting means 12 may be provided within said gap 16. Specifically, the lighting means 12 may be provided at or in immediate proximity to the outer glass element 11.1 in order to avoid an overheating of said lighting means 12. Specifically, the light guides 14, i.e. the optical fibres, grooves or stripes may be provided at the inner surface of the outer glass element 11.1., i.e. the surface facing the inner glass element 11.2. The light sources 13 may be attached to the structural element of the oven door 10 by means of a support unit 17. More in detail, the support unit 17 may be attached to the side portion of the structural element which limits the gap 16 laterally and may comprise support means for fixing one or more light source elements 18 comprising one or more light sources 13. For example, the light source element 18 may be a circuit board comprising one or more light sources 13 (e.g. LEDs) and additional electronics for operating the light sources 13. The support unit 17 and the light source element 18 may be arranged such that light is coupled into the light guides 14.

In order to avoid an overheating of the lighting means 12, specifically the light sources 13 and other electronics, an air circulation may be provided. For example, cool air may be conveyed through the gap 16 thereby avoiding an exceeding heat impact on the lighting means 12. For example, the frame 10.1 or other structural elements of the door may comprise openings through which air is conveyed into the gap 16, e.g. by means of a fan.

According to preferred embodiments, a control unit for operating the lighting means 12 is provided within the oven door 10. More in detail, the control unit is arranged in a cavity of the frame 10.1 of the oven door 10. Preferably, the control unit may be placed at a location within the frame 10.1 at which a low heat impact on the control unit is achieved. Furthermore, the control unit may be cooled by means of a cool air flow which is provided through the frame 10.1. Alternatively, said control unit for operating the lighting means 12 may be placed at oven's side (e.g. control panel area) as well. In that case no extra cool air flow being required and the said control unit is close to the power supply.

Above, embodiments of an oven door according to the present invention as defined in the appended claims have been described. These should be seen as merely non-limiting examples. As understood by a skilled person, many modifications and alternative embodiments are possible within the scope of the invention.

LIST OF REFERENCE NUMERALS

1 oven
2 oven cavity
10 oven door
10.1 frame
11 glass portion
11.1 outer glass element
11.2 inner glass element
12 lighting means
13 light source
14 light guide
15 cover plate
16 gap
17 support unit
18 light source element

The invention claimed is:

1. Oven door for closing a cavity of an oven comprising:
    an inner glass element facing the oven cavity;
    an outer glass element arranged at a distance from the inner glass element and being at least partially transparent for enabling a user to look into the oven cavity;
    a lighting unit implementing an optical user interface for displaying optical information at the inner glass element and/or the outer glass element; and a gap provided between the inner glass element and the outer glass element,
wherein cool air is conveyed through the gap to cool the lighting unit.

2. Oven door according to claim 1, wherein the lighting unit comprise one or more light sources arranged at one of the inner glass element and the outer glass element.

3. Oven door according to claim 1, wherein the lighting unit comprise one or more light guides arranged at or in proximity to one of the inner glass element and the outer glass element.

4. Oven door according to claim 3, wherein the light guides are optical fibers.

5. Oven door according to claim 4, wherein the optical fibers are glued to one of the inner glass element and the outer glass element or are fixed by a protective layer attached at one of the inner glass element and the outer glass element.

6. Oven door according to claim 4, wherein the optical fibers are side emitting fibers adapted to emit light in the front direction of the oven door.

7. Oven door according to claim 4, wherein outer diameter of the optical fibers is 0.5 mm to 5 mm.

8. Oven door according to claim 3, wherein the one or more light guides are milled or grinded into one of the inner glass element and the outer glass element.

9. Oven door according to claim 3, wherein the one or more light guides are coupled with light sources arranged at the outer edge of one of the inner glass element and the outer glass element or within a frame of the oven door.

10. Oven door according to claim 1, wherein the lighting unit is arranged between the inner and outer glass elements.

11. Oven door according to claim 1, wherein the lighting unit comprises at least one light emitting diode.

12. Oven door according to claim 11, wherein the light emitting diode is a multi-color light emitting diode.

13. Oven door according to claim 1, wherein a control unit for driving the lighting unit is arranged in a frame of the oven door.

14. Oven for preparing food comprising an oven cavity and the oven door according to claim 1 for closing the oven cavity.

15. Oven door for closing a cavity of an oven, comprising:

an at least partially transparent glass portion that comprises an inner glass element, an outer glass element and an air gap therebetween to enable a user to look into the cavity when the door is closed;

a multi-colored LED disposed along an edge of an inner surface of the outer glass element so that said multi-colored LED is not visible through the glass portion when the door is closed, said multi-colored LED being configured such that the color and/or intensity of light emitted therefrom is/are variable based on an operative state of the oven in order to convey information regarding said operating state to a user such that said information is discernible from at least several meters from the oven door when in use;

a control unit for driving said multi-colored LED; and a light guide arranged at or in proximity to the inner surface of the outer glass element and extending from said edge thereof such that said light emitted from said multi-colored LED is directly coupled into said light guide, said light guide extending over said inner surface to guide said light in a predefined way in order to provide light at certain areas of the glass portion;

wherein during operation of said oven said multi-colored LED and said control unit are cooled by an air stream flowing through said air gap.

16. Oven door according to claim 15, said light guide comprising a semi-transparent optical fiber attached or fixed to said inner surface of said outer glass element, wherein when said light propagates therethrough it is reflected in a spatially distributed manner in order to be emitted radially such that the light is emitted over a full length of said optical fiber.

17. Oven door according to claim 15, said light guide comprising a groove that is ground or milled into said outer glass element from said inner surface thereof, wherein a surface of said groove is roughened in order to reflect said light propagating therein in order to spatially distribute said light.

* * * * *